Stevens & Cauvet,
Wood Pavement.

No. 105,138. Patented July 5, 1870.

Witnesses:
Phil. T. Dodge
Thomas Taylor Jr.

Inventor
A. Stevens
L. A. Cauvet
by Dodge & Munn
his atty's

UNITED STATES PATENT OFFICE.

ANDREW STEVENS AND LOUIS A. CAUVET, OF NEW YORK, N. Y.

IMPROVEMENT IN PAVEMENTS.

Specification forming part of Letters Patent No. 105,138, dated July 5, 1870.

*To all whom it may concern:*

Be it known that we, ANDREW STEVENS and LOUIS A. CAUVET, of New York city, in the county of New York and State of New York, have invented certain Improvements in Pavement, of which the following is a specification, reference being had to the accompanying drawing.

Our invention has for its object the production of a cheap and strong pavement, capable of withstanding the wear and travel of a crowded thoroughfare, that may be taken up when the street is to be opened for laying pipes, &c., and then readily relaid, without injury; and it consists in constructing a pavement of a series of shallow trays, containing the stone, wood, concrete, or other material used, and in a novel manner of constructing the said trays and locking them together, as hereinafter described.

Figure 1:
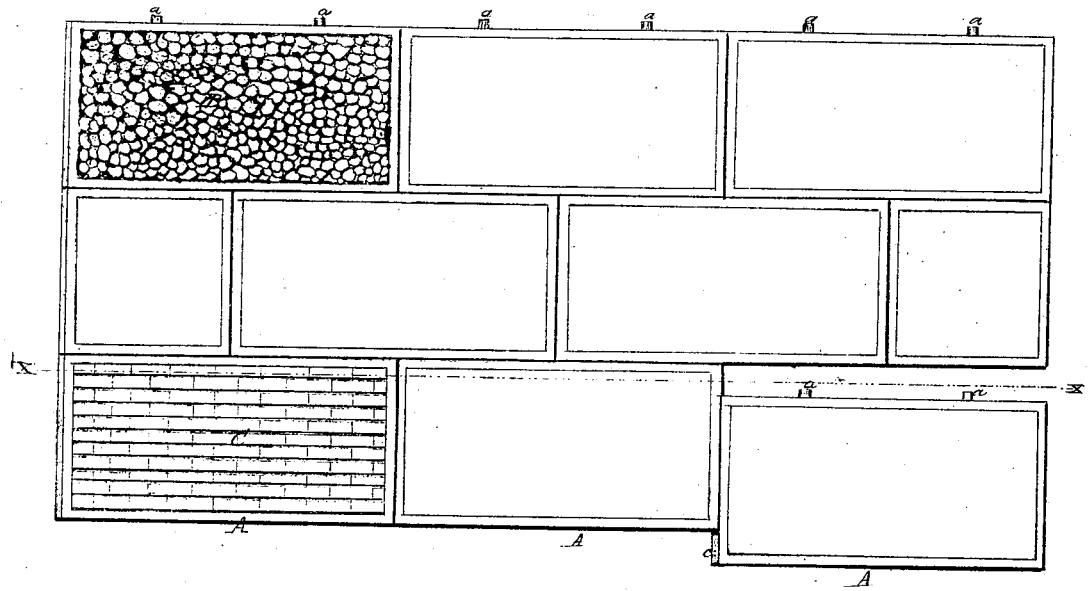
Figure 2:
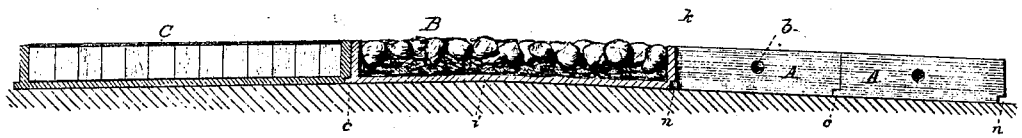

Figure 1 is a top-plan view of our improved pavement, one of the trays being shown partially removed; and Fig. 2 is a vertical cross-section of the same on the line $x\ x$.

In constructing our pavement we first make shallow boxes or trays, A, each consisting of a bottom, $i$, having a raised ledge or rim, $k$, around its outer edges, as shown in Figs. 1 and 2; and within these trays we place the material that is to form the bed of the pavement, which may consist of cobble-stone, as shown at B, of wooden blocks, as at C, or of concrete or other suitable material, the filling being, in all cases, brought about level with the ledges $k$, as shown.

These trays or sections A may be of rectangular, triangular, hexagonal, or other forms that will fit together without leaving spaces or openings between. Preference is, however, given to an oblong rectangular form, as shown in Fig. 1.

Each of the trays we form with a projecting strip or ledge, $c$, along the lower edge of one end, and the lower edge of the opposite end we cut away, as shown at $n$, Fig. 2, and one side of each frame we provide with two or more dowel-pins, $a$, as shown in Fig. 1, and the opposite side with an equal number of holes, $b$, as shown in Fig. 2.

It is obvious that these trays may be made of various sizes and of different materials, according to the locality and the amount of travel over them. For ordinary use, however, we prefer to make them of hard wood, treated with coal-tar or similar preservative material.

The trays or sections thus constructed we lay end to end, in rows, with the strip $c$ of each tray extending into the recess $n$ under the next tray, as shown in Fig. 2, and so that the trays in one row break joints with the adjoining rows; and, further, that the dowel-pins of one row enter the holes of the next row, as shown in Fig. 1, the whole series being in this manner locked firmly together. Each frame is placed in position by laying it down and shoving it endwise to its place, as shown in the lower right-hand corner in Fig. 1. When the pavement is to be taken up temporarily, for any reason, a row or part of a row of the frames is pried up, and others removed, as necessary, by sliding them out.

If at any time portions of the pavement become worn or otherwise damaged, the frames comprising such portions may be quickly taken up and replaced by others.

What we claim as our invention is—

A pavement consisting of a series of boxes or trays, B, provided with the recesses $n$ and flanges $c$, and the dowel-pins $a$, with corresponding holes $b$, said trays being arranged substantially as described, and filled with concrete, blocks of wood, or other suitable material, as set forth.

ANDREW STEVENS.
LOUIS A. CAUVET.

Witnesses:
JAMES CLARKSON,
GEORGE W. BEAM.